Patented Apr. 8, 1924.

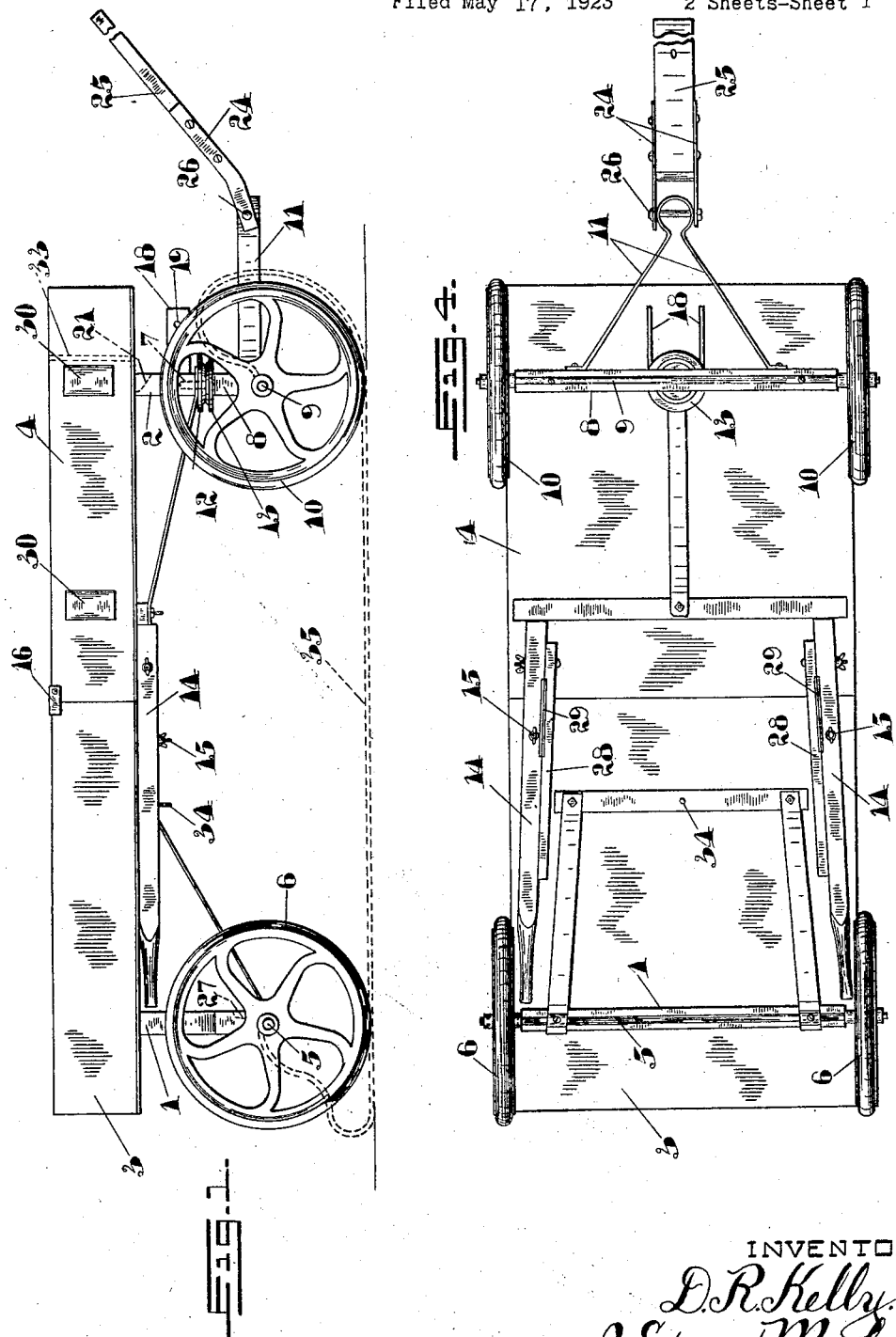

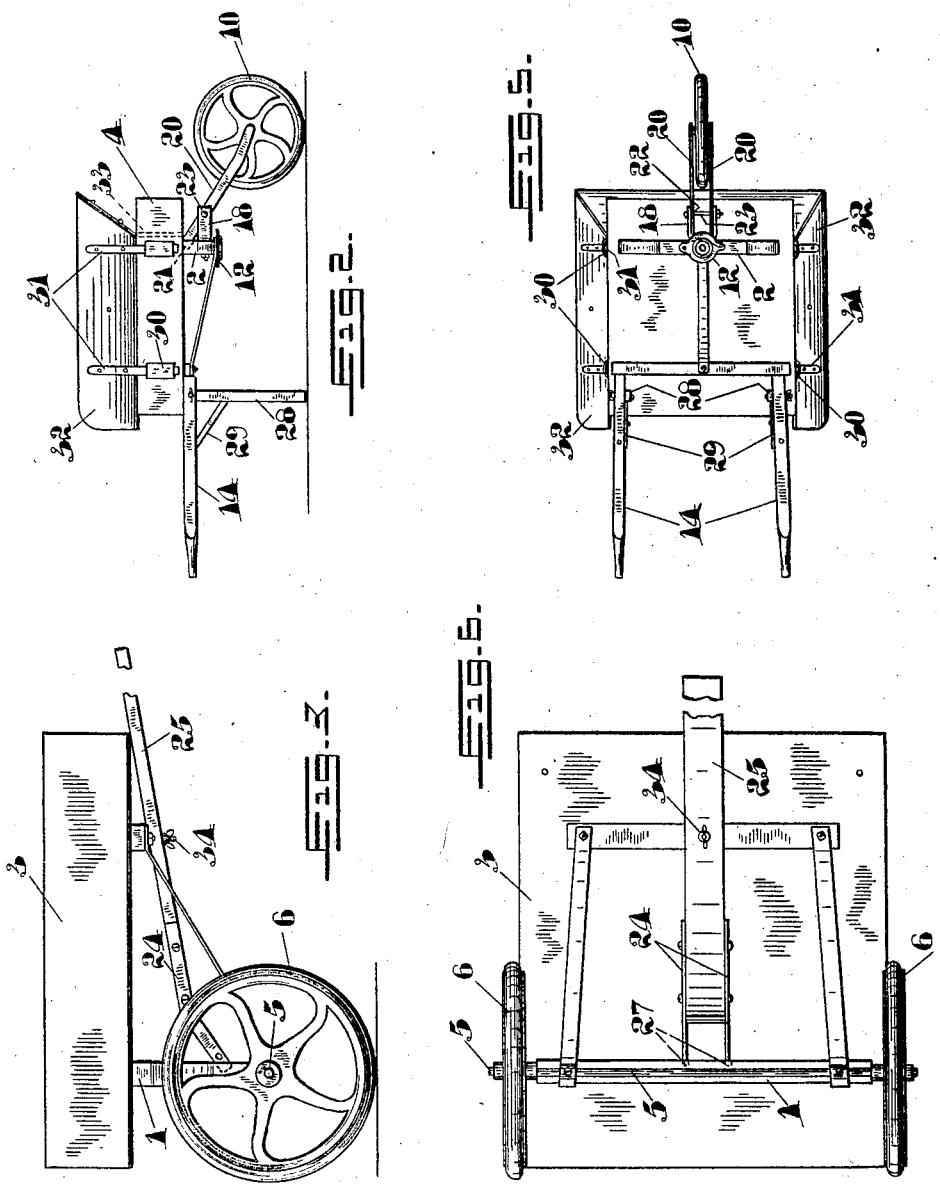

1,489,443

UNITED STATES PATENT OFFICE.

DANIEL R. KELLY, OF TORONTO, ONTARIO, CANADA, ASSIGNOR TO CHARLES H. EVANS, OF TORONTO, CANADA.

CHILD'S VEHICLE.

Application filed May 17, 1923. Serial No. 639,544.

*To all whom it may concern:*

Be it known that I, DANIEL R. KELLY, of the city of Toronto, in the county of York, Province of Ontario, Canada, a subject of the King of Great Britain, have invented certain new and useful Improvements in Children's Vehicles, of which the following is a specification.

This invention relates to children's vehicles, and the object of my invention is to devise an improved construction of wagon, which may be conveniently taken apart so that one section may be fitted up as a wheelbarrow and the other section as a push cart.

I attain my object by means of the constructions hereinafter described and illustrated in the accompanying drawings in which—

Fig. 1 is a side elevation of my improved vehicle in use as a wagon;

Fig. 2 a side elevation of the front section of the same in use as a wheelbarrow;

Fig. 3 a side elevation of the rear section of the same in use as a push cart;

Fig. 4 a plan view of the underside of the vehicle as shown in Fig. 1;

Fig. 5 a plan view of the underside of the wheelbarrow as shown in Fig. 2; and

Fig. 6 a plan view of the underside of the push cart as shown in Fig. 3.

In the drawings like numerals of reference indicate corresponding parts in the different figures.

1 is a rear bolster and 2 a front bolster. On the upper edge of the rear bolster is supported one end of the rear section 3 of a divided wagon box; while on the upper edge of the front bolster is supported the forward end of the forward section 4 of the wagon box. To the lower edge of the rear bolster 1 is secured the rear axle 5 and on the ends of the rear axle are journalled the rear wheels 6.

Pivotally connected with the front bolster by means of a king pin 7 is a wooden axle 8, and on the lower edge of this wooden axle is secured the metal axle 9 on the ends of which are journalled the front wheels 10. The king pin 7 is preferably permanently secured to the axle 8 and the bolster provided with a suitable socket for receiving the same. To the lower edge of the front bolster 2 is secured the bearing plate 12 while to the upper edge of the wooden axle 8 is secured the bearing plate 13. To the wooden axle 8 are secured the hounds 11 which are received between members 24 secured to the handle 25, the hounds 11 and members 24 being provided with suitable holes through which a bolt 26 may be passed.

Secured to the under side of the forward box section 4 and extending rearwardly therefrom are the members 14, which, when the device is used as a wagon, support the front end of the rear section 3 of the wagon box, bolts 15 being provided passing through the bottom of the box and through the members 14 for holding the parts in proper position. To retain the upper abutting corners of the box sections in proper relationship to one another, the keepers 16 are pivotally mounted on one section and are adapted to be engaged with the upper corners of the other section.

When it is desired to use the front part of the device as a wheelbarrow, the bolts 15 are removed and the keepers 16 disengaged so that the rear portion of the wagon may be removed. The members 14 are then used as the handles of the wheelbarrow.

The front axle is then removed by withdrawing the king pin from the socket in the front bolster. One of the wheels 10 is removed from the axle 9, and this wheel is mounted on the wheelbarrow in the following manner. To the front of the bolster 2 is secured the U-shaped member 18, in the legs of which are formed alined holes 19. 20 is the wheel support, which comprises a pair of arms, the outer ends of which are formed so as to engage in the hub of the wheel. The inner ends of the arms engage in notches 21 formed in the forward side of the bolster 2 close to the box. In the member 20 in alinement with the holes 19 in the member 18 are formed holes 22, and through the holes 19 and 22 is passed a bolt 23. The wheel, it will be seen from the construction described and shown, is thus held firmly in position.

28 are the legs for the wheelbarrow, which legs are pivoted on the sides of the handles adjacent their point of connection to the body. When in use, these legs are braced by the folding braces 29.

To set up the rear part of the wagon for use as a push cart, the handle 25 is disengaged from the hounds 11 by removing the bolt 26. The ends of the members 24 are then engaged in notches 27 in the forward face of the rear bolster 1, and a bolt 34, adjacent the forward end of the rear box section 3, is passed through a suitable hole in the handle 25 and a nut set up thereon. The handle is thus held firmly in position and the rear half of the wagon may then be used as an ordinary push cart.

The body of the wagon will preferably be formed of sheet metal, although I may, if desired, form it of wood. The sides and end of the forward section 4 of the wagon box will be suitably stamped out to form sockets 30 for receiving the supports 31 of the extensions 32 for the sides and end of the barrow.

When the device is used as a wagon, the spare parts are packed in a box 33 formed at the front end of the wagon, while the removable extensions 32 for the sides and end are secured to the under side of the body by means of the bolt 34. The legs 28 are also swung up against the under side of the body.

If it is desired to use the device as a sleigh, the wheels may be removed and special runners 35 may be mounted on the axles as indicated in dotted lines in Fig. 1.

From the foregoing specification it will be seen that I have devised a construction which satisfactorily attains the object of my invention as set out in the preamble of the specification.

What I claim as my invention is:—

1. In a child's vehicle, the combination of a pair of bolsters; a rear axle carrying wheels connected to the rear bolster; a front axle carrying wheels and adapted to be pivotally connected with the front bolster; a wagon body divided transversely into front and rear sections, each section being secured to the corresponding bolster; and means for detachably connecting together the wagon body sections.

2. In a child's vehicle, the combination of a pair of bolsters; a rear axle carrying wheels connected to the rear bolster; a front axle carrying wheels and adapted to be pivotally connected with the front bolster; a wagon body divided transversely into front and rear sections, each section being secured to the corresponding bolster; members secured adjacent the rear end of the front section and adapted to support the forward end of the rear section; and bolts securing the rear section to said members.

3. In a child's vehicle, the combination of a pair of bolsters; a rear axle carrying wheels connected to the rear bolster; a front axle carrying wheels and adapted to be pivotally connected with the front bolster; a wagon body divided transversely into front and rear sections, each section being secured to the corresponding bolster; members secured adjacent the rear end of the front section and adapted to support the forward end of the rear section; bolts securing the rear section to said members; and keepers secured to the upper corners of one body section adapted to engage the abutting corners of the other section.

4. In a child's vehicle, the combination of a pair of bolsters; a rear axle carrying wheels connected to the rear bolster; a front axle carrying wheels and adapted to be pivotally connected with the front bolster; a wagon body divided transversely into front and rear sections, each section being secured to the corresponding bolster; means for detachably connecting together the wagon body sections; and legs pivotally secured at the rear end of the front box section.

5. In a child's vehicle, the combination of a pair of bolsters; a rear axle carrying wheels connected to the rear bolster; a front axle carrying wheels and adapted to be pivotally connected with the front bolster; a wagon body divided transversely into front and rear sections, each section being secured to the corresponding bolster; means for detachably connecting together the wagon body sections; legs pivotally secured at the rear end of the front box section; and a folding brace secured at one end to each leg adjacent its free end and at its other end to the bottom of the front section towards its forward end.

6. In a child's vehicle, the combination of a body member; a bolster secured adjacent the forward end of the body and having notches formed in its forward side; handles secured to and extending rearwardly from the rear end of the body; a U-shaped member secured to the forward side of said bolster, the legs of the U each having a hole formed therein; a wheel-carrying member comprising a pair of arms the ends of which extend into said notches, said arms having holes formed therein in alinement with the holes in the U-shaped member; and a bolt passing through the holes in the U-shaped member and the holes in said arms.

Signed at Toronto, Canada, this 17th day of April, 1923.

DANIEL R. KELLY.